(12) United States Patent
Hewlett et al.

(10) Patent No.: US 11,204,973 B2
(45) Date of Patent: Dec. 21, 2021

(54) TWO-STAGE TRAINING WITH NON-RANDOMIZED AND RANDOMIZED DATA

(71) Applicant: Microsoft Technology Licensing, LLC, Redmond, WA (US)

(72) Inventors: Daniel Sairom Krishnan Hewlett, Sunnyvale, CA (US); Dan Liu, Santa Clara, CA (US); Qi Guo, Sunnyvale, CA (US); Wenxiang Chen, Sunnyvale, CA (US); Xiaoyi Zhang, Sunnyvale, CA (US); Lester Gilbert Cottle, III, Sunnyvale, CA (US); Xuebin Yan, Sunnyvale, CA (US); Yu Gong, Santa Clara, CA (US); Haitong Tian, San Jose, CA (US); Siyao Sun, Mountain View, CA (US); Pei-Lun Liao, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 347 days.

(21) Appl. No.: 16/449,149

(22) Filed: Jun. 21, 2019

(65) Prior Publication Data

US 2020/0401644 A1 Dec. 24, 2020

(51) Int. Cl.
*G06F 16/9538* (2019.01)
*G06N 3/04* (2006.01)
(Continued)

(52) U.S. Cl.
CPC ........ *G06F 16/9538* (2019.01); *G06F 40/205* (2020.01); *G06N 3/04* (2013.01); *G06N 20/00* (2019.01)

(58) Field of Classification Search
None
See application file for complete search history.

(56) References Cited

U.S. PATENT DOCUMENTS 8,060,456 B2 11/2011 Gao et al.
9,569,735 B1 * 2/2017 Zhu .................. H04L 67/306
(Continued)

OTHER PUBLICATIONS

"Non Final Office Action Issued in U.S. Appl. No. 16/449,110", dated May 21, 2021, 33 Pages.
(Continued)

*Primary Examiner* — Thu N Nguyen
(74) *Attorney, Agent, or Firm* — Schwegman Lundberg & Woessner, P.A.

(57) ABSTRACT

In an example embodiment, position bias and other types of bias may be compensated for by using two-phase training of a machine-learned model. In a first phase, the machine-learned model is trained using non-randomized training data. Since certain types of machine-learned models, such as those involving deep learning (e.g., neural networks) require a lot of training data, this allows the bulk of the training to be devoted to training using non-randomized training data. However, since this non-randomized training data may be biased, a second training phase is then used to revise the machine-learned model based on randomized training data to remove the bias from the machine-learned model. Since this randomized training data may be less plentiful, this allows the deep learning machine-learned model to be trained to operate in an unbiased manner without the need to generate additional randomized training data.

20 Claims, 10 Drawing Sheets

(51) Int. Cl.
*G06N 20/00* (2019.01)
*G06F 40/205* (2020.01)

(56) References Cited

U.S. PATENT DOCUMENTS

| | | | |
|---|---|---|---|
| 9,607,077 | B2 | 3/2017 | Li et al. |
| 10,277,715 | B1 | 4/2019 | Yan |
| 10,303,681 | B2 | 5/2019 | Noh et al. |
| 10,713,716 | B2* | 7/2020 | Mahapatra .......... G06F 16/9535 |
| 11,003,720 | B1 | 5/2021 | Xia et al. |
| 2008/0195601 | A1 | 8/2008 | Ntoulas et al. |
| 2008/0225870 | A1 | 9/2008 | Sundstrom et al. |
| 2009/0177599 | A1 | 7/2009 | Bhaskar et al. |
| 2010/0082510 | A1 | 4/2010 | Gao |
| 2010/0205198 | A1* | 8/2010 | Mishne ............... G06F 16/3346 707/759 |
| 2013/0159219 | A1 | 6/2013 | Pantel et al. |
| 2013/0185277 | A1* | 7/2013 | Hampole .............. G06F 16/958 707/711 |
| 2015/0006286 | A1 | 1/2015 | Liu et al. |
| 2017/0039483 | A1 | 2/2017 | Cheng et al. |
| 2017/0068992 | A1 | 3/2017 | Chen et al. |
| 2017/0178031 | A1 | 6/2017 | Zhu et al. |
| 2017/0308609 | A1 | 10/2017 | Berkhin et al. |
| 2017/0308806 | A1 | 10/2017 | Chao et al. |
| 2018/0046721 | A1* | 2/2018 | Thornton ............... G06N 20/00 |
| 2018/0084078 | A1 | 3/2018 | Yan |
| 2018/0137857 | A1 | 5/2018 | Zhou et al. |
| 2018/0150464 | A1 | 5/2018 | Ma et al. |
| 2018/0232375 | A1* | 8/2018 | Venkataraman ....... G06N 5/003 |
| 2018/0285957 | A1 | 10/2018 | Ng et al. |
| 2019/0005409 | A1 | 1/2019 | Doshi et al. |
| 2019/0019157 | A1 | 1/2019 | Saha et al. |
| 2019/0034792 | A1 | 1/2019 | Kataria et al. |
| 2019/0050813 | A1 | 2/2019 | Guo et al. |
| 2019/0052720 | A1 | 2/2019 | Guo et al. |
| 2019/0102395 | A1 | 4/2019 | Kshetramade |
| 2019/0187955 | A1 | 6/2019 | Green |
| 2019/0205905 | A1 | 7/2019 | Raghunathan et al. |
| 2019/0392082 | A1 | 12/2019 | Bell et al. |
| 2020/0342252 | A1 | 10/2020 | Giventai et al. |
| 2020/0401594 | A1 | 12/2020 | Hewlett et al. |
| 2020/0401627 | A1 | 12/2020 | Liu et al. |
| 2020/0401643 | A1 | 12/2020 | Liu et al. |

OTHER PUBLICATIONS

"Non Final Office Action Issued in U.S. Appl. No. 16/449,135", dated Apr. 15, 2021, 10 Pages.

Hu, et al., "Unbiased LambdaMART: An Unbiased Pairwise Learning-to-Rank Algorithm", In Proceedings of The World Wide Web Conference, May 13, 2019, pp. 2830-2836.

* cited by examiner

RECRUITER  PROJECTS  CLIPBOARD  JOBS  REPORTS  MORE

Q START A NEW SEARCH

NEW FEATURES ⌄

SHOWING RESULTS FOR | ⋮⋮⋮ | ⌄
JOB TITLES  CURRENT
( SOFTWARE ENGINEER ) +
+ SCIENTIST,

LOCATIONS
+ ADD LOCATIONS
+ SAN FRANCISCO BAY AREA

SKILLS
( PYTHON ) ( JAVA ) ( ALGORITHMS )
( MACHINE LEARNING ) ( MATLAB )
( DATA MINING )
+ ARTIFICIAL INTELLIGENCE, +R,...

COMPANIES  CURRENT OR ...  ⌄
+ ADD COMPANIES
+ XYZ, +ABC, +123

SCHOOLS  ENDING ANY TO...
+ ADD SCHOOLS

INDUSTRIES
( INTERNET ) ( CONSUMER ELE... )

2.6K TOTAL CANDIDATES  1.2K HAVE COMPANY CONNECTIONS  231 ENGAGED WITH YOUR TALENT BRAND 2,600 RESULTS - SORTED BY RELEVANCE                    1 – 26 ☐

FRANK JEFFRY [2ND] ~802
STAFF SOFTWARE ENGINEER AT LINKEDIN
SAN FRANCISCO BAY AREA - INTERNET
CURRENT  STAFF SOFTWARE ENGINEER - DATA MINING/DATA/ANALYSIS...
PAST     SOFTWARE ENGINEER AT XYZ 2012-2016
         SCIENTIST AT ABC 2011-2012
EDUCATION  THE UNIVERSITY OF TEXAS AT AUSTIN
4 SHARED CONNECTIONS  ✉ 1 MESSAGE  ⌕ COMPANY FOL...

JIMBO FRANKS [2ND] ~804
MACHINE LEARNING, RECOMMENDER SYSTEMS,
INFORMATION...
SAN FRANCISCO BAY AREA - INTERNET
CURRENT  SOFTWARE ENGINEER AT ABC 2016-PRESENT
PAST     PRINCIPAL RESEARCH ENGINEER AT 123 2016-2016
         PRINCIPAL RESEARCH ENGINEER AT 123 2015-2016
EDUCATION  UNIVERSITY OF FLORIDA 2002-2009
11 SHARED CONNECTIONS  ✉ 1 MESSAGE  ⌕ COMPANY FOL...

SHUN SHING [2ND] ~806
SOFTWARE ENGINEER INTERNSHIP AT XYZ
GREATER NEW YORK CITY AREA - HIGHER EDUCATION

TWO-STAGE TRAINING WITH NON-RANDOMIZED AND RANDOMIZED DATA

TECHNICAL FIELD

The present disclosure generally relates to computer technology for solving technical challenges in machine learning. More specifically, the present disclosure relates to two-stage training of a machine-learned model with non-randomized and randomized data.

BACKGROUND

The rise of the Internet has given rise to two different, yet related, phenomena: the increase in the presence of social networks, with their corresponding member profiles visible to large numbers of people, and the increase in the desirability of reaching out to small groups of social network members who meet strict criteria. This is especially pronounced in the field of recruiting, where recruiters are typically attempting to find members with particular qualifications (e.g., education, experience, skills, etc.) and then generally the recruiters reach out to members with the particular qualifications to find out whether or not the members may be willing to apply for the job openings the recruiter has available.

Job solicitation communications, such as emails sent by recruiters to members who may be prospective job applicants, can take a lot of time on the part of the recruiters, especially if done effectively. Effective job solicitation communications generally include personalized information about the member and have the solicitation geared specifically towards that member, thus making it look less like a mass communication sent to many potential applications and more like the recruiter has specifically targeted the member. Recruiters, however, have a limited amount of time to spend in creating such job solicitation communications, and thus would benefit greatly if mechanisms were in place to reduce the likelihood that such time would be wasted. A technical problem arises in determining whether a particular member, gauged from information available to a computer system, is likely to respond to a particular communication, and even if such a determination were feasible, how to utilize such information to reduce wasted resources. Additionally, a recruiter would also benefit if he or she were presented with candidate results of candidates that the recruiter is likely to want to contact. Another technical problem arises, however, in determining whether a particular recruiter is likely to want to contact a particular member.

One way to address these problems is to create a machine-learned model that produces, for a given candidate, a score indicative of both the probability that a recruiter will want to contact the candidate and that the candidate will respond to such a contact. The scores for multiple candidates may then be used to rank the candidates to determine an ordering in which to display the candidates for a recruiter. A technical issue that arises with the use of such machine-learned models is position bias. Specifically, training data supplied for training the machine-learned model using a machine learning algorithm may introduce a bias into the training that may produce inaccurate scores. This bias is caused by the propensity of humans to favor items that are presented higher up in a list. This causes recruiters to be more likely to contact candidates who have been presented to them higher up in a list, and thus the training data, which is often pulled from actual past recruiter/candidate interactions, winds up being biased in the favor of higher ranked candidates.

BRIEF DESCRIPTION OF THE DRAWINGS

Some embodiments of the technology are illustrated, by way of example and not limitation, in the figures of the accompanying drawings.

FIG. 8 is a screen capture illustrating a graphical user interface (GUI) for displaying results of the ranking performed in FIG. 7.

DETAILED DESCRIPTION

Overview

In an example embodiment, position bias and other types of bias may be compensated for by using two-phase training of a machine-learned model. In a first phase, the machine-learned model is trained using non-randomized training data. Since certain types of machine-learned models, such as those involving deep learning (e.g., neural networks) require a lot of training data, this allows the bulk of the training to be devoted to training using non-randomized training data. However, since this non-randomized training data may be biased, a second training phase is then used to revise the machine-learned model based on randomized training data to remove the bias from the machine-learned model. Since this randomized training data may be less plentiful, this allows the deep learning machine-learned model to be trained to operate in an unbiased manner without the need to generate additional randomized training data.

In further example embodiments, the machine-learned model may be used in the context of searches performed for people in an online service provider. A searcher may explicitly or implicitly specify a query for search results, and a search engine may retrieve results that satisfy this query. The search results may then be ranked using the machine-learned model and presented to the searcher. The searcher may then elect to perform various actions on the search results, including contacting one or more users corresponding to the search results.

In an example embodiment, the machine-learned model is a neural network. The neural network is trained to determine both the probability that a searcher would select a given potential search result if it was presented to him or her and the probability that a subject of the potential search result would respond to a communication from the searcher. These probabilities are essentially combined to produce a single score that can be used to determine whether to present the searcher with the potential search result and, if so, how high to rank the potential search result among other search results.

Description

The present disclosure describes, among other things, methods, systems, and computer program products that individually provide functionality for one or more machine learning algorithm models. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

Figure 1:
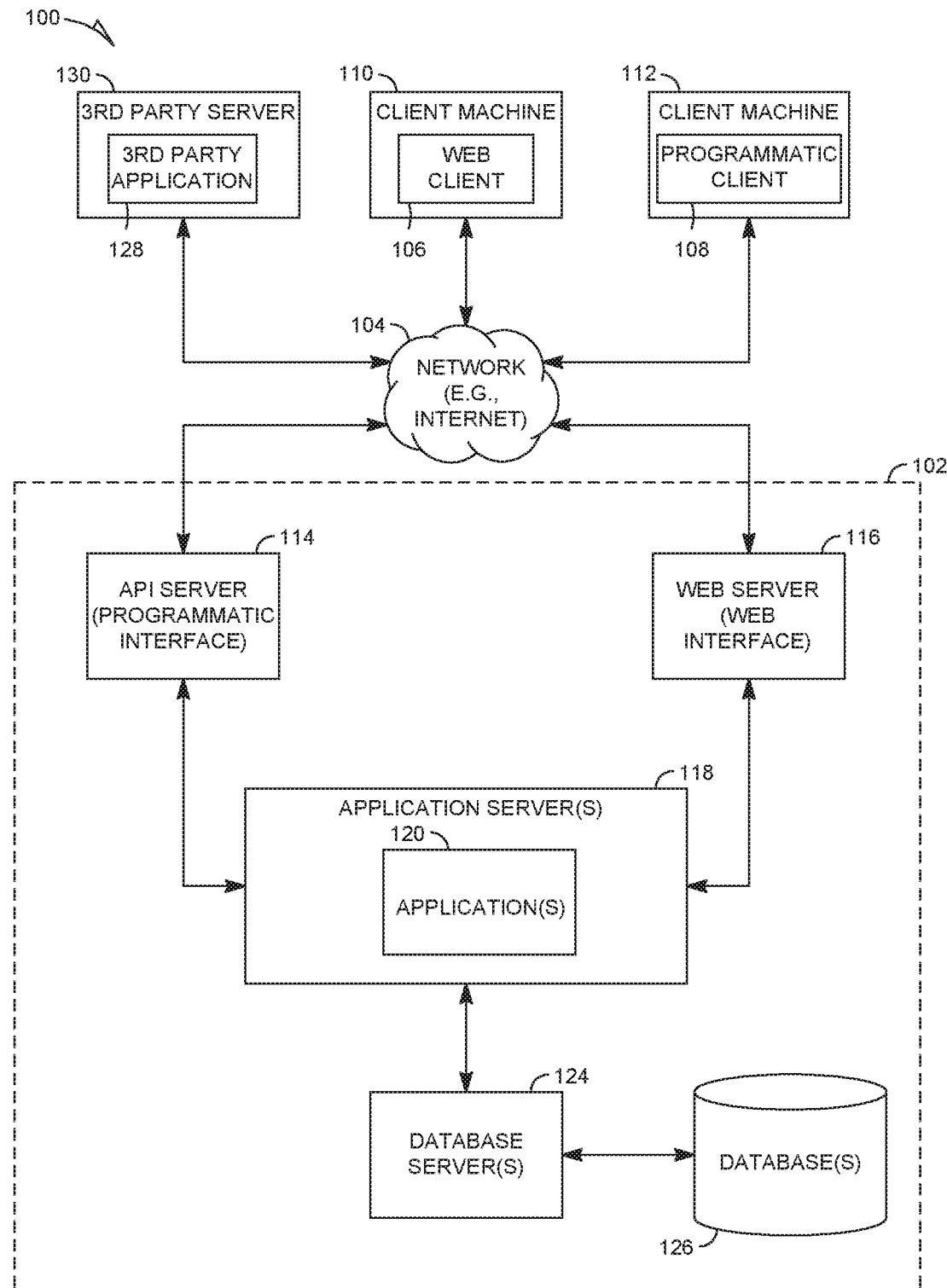
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third party application 128, executing on a third party server 130, as having programmatic access to the networked system 102 via the programmatic interface provided by the API server 114. For example, the third party application 128 may, utilizing information retrieved from the networked system 102, support one or more features or functions on a website hosted by a third party. The third party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
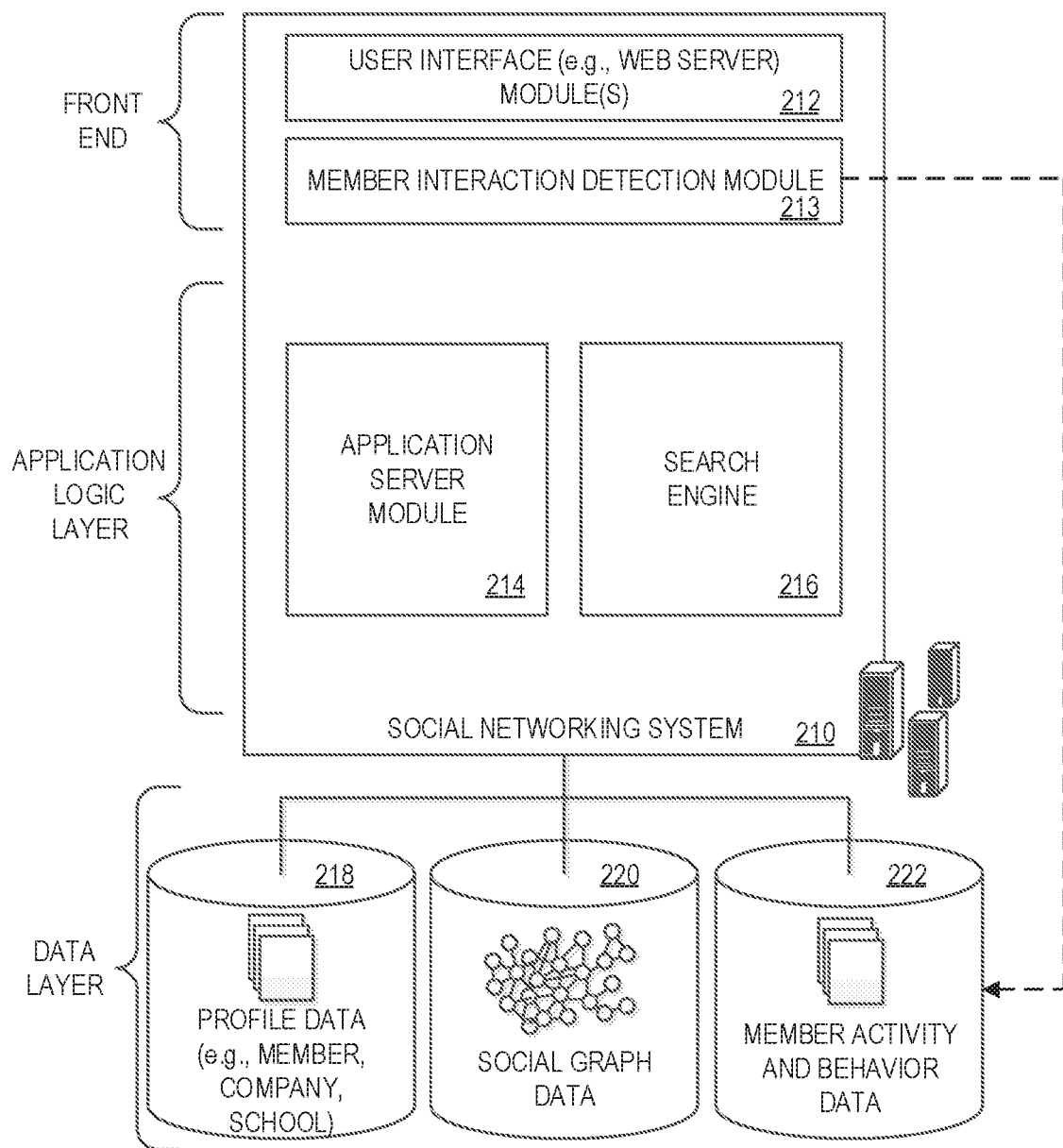
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow" another member. In contrast to establishing a connection, the concept of "following" another member typically is a unilateral operation and, at least in some embodiments, does not require acknowledgement or approval by the member that is being followed. When one member follows another, the member who is following may receive status updates (e.g., in an activity or content stream) or other messages published by the member being followed or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking service system 210 provides an API module via which applications 120 and services can access various data and services provided or maintained by the social networking service. For example, using an API, an application may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
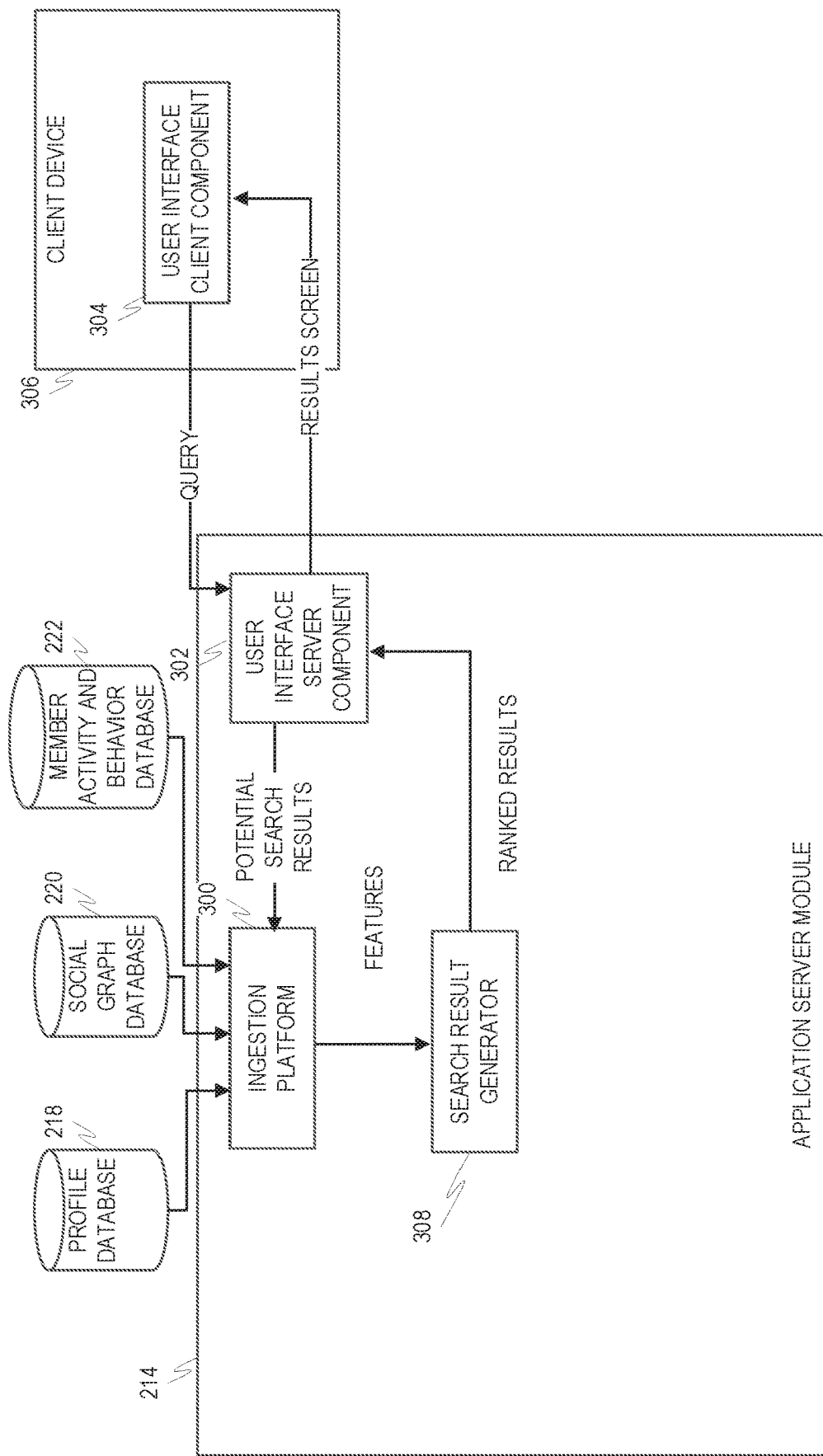
FIG. 3 is a block diagram illustrating an application server module of FIG. 2 in more detail.

FIG. 3 is a block diagram illustrating an application server module 214 of FIG. 2 in more detail. While in many embodiments the application server module 214 will contain many subcomponents used to perform various different actions within the social networking system, in FIG. 3 only those components that are relevant to the present disclosure are depicted. Here, an ingestion platform 300 obtains information from the profile database 218, the social graph database 220, and the member activity and behavior database 222 relevant to a query submitted by a searcher via a user interface server component 302. The user interface server component 302 communicates with a user interface client component 304 located on a client device 306 to obtain this identification information. The details of the user interface client component 304 will be described in more detail below, but generally a user, known hereafter as a searcher, of the user interface client component 304 may begin a search or otherwise cause generation of a search that provides search results of members with whom the searcher may wish to communicate. Information about each of these members is identified in the search results. The user interface server component 302 may generate potential search results based on the query and send identifications of these potential search results to the ingestion platform 300, which can use the identifications to retrieve the appropriate information corresponding to those potential search results from the profile database 218, the social graph database 220, and the member activity and behavior database 222. As will be discussed in more detail below, in some example embodiments, information about the searcher, such as a recruiter, may also be relevant to a prediction from the machine learned models described later. As such, an identification of the searcher may also be communicated via the user interface server component 302 to the ingestion platform 300, which can use the identifications to retrieve the appropriate information corresponding to the searcher from the profile database 218, the social graph database 220, and the member activity and behavior database 222.

The ingestion platform 300 may then provide the relevant information from the profile database 218, the social graph database 220, and the member activity and behavior database 222 to a search result generator 308, which acts to determine which of the potential search results to return and a ranking for those potential search results. In some example embodiments, this information is transmitted in the form of feature vectors. For example, each potential search result may have its own feature vector. In other example embodiments, the ingestion platform 300 sends raw information to the search result generator 308 and the search result generator 308 creates its own feature vectors from the raw information.

The ranked results may then be passed from the search result generator 308 to the user interface server component 302, which acts to cause the user interface client component 304 to display at least a portion of the ranked results.

Figure 4:
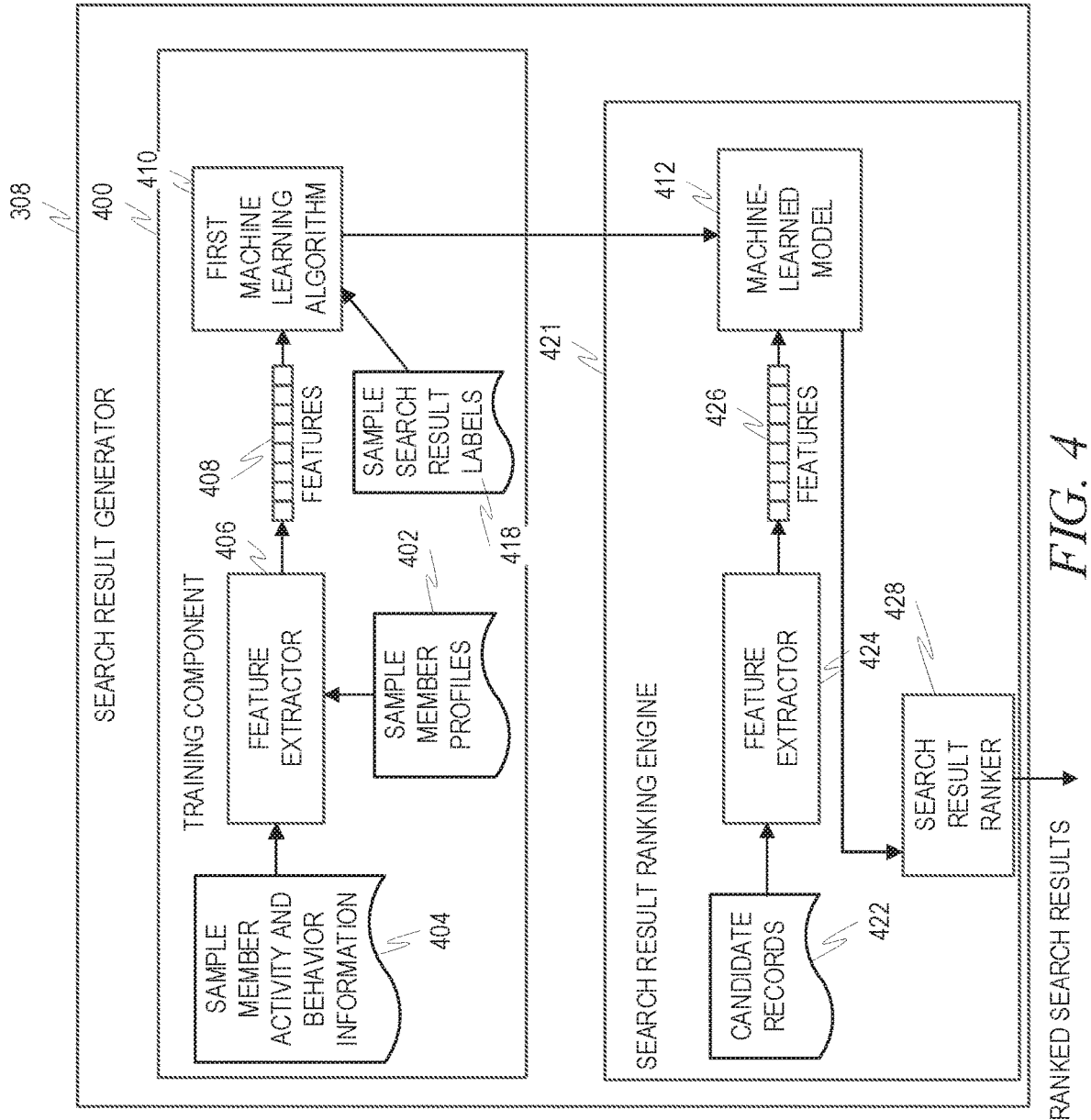
FIG. 4 is a block diagram illustrating the search result generator of FIG. 3 in more detail, in accordance with an example embodiment.

FIG. 4 is a block diagram illustrating the search result generator 308 of FIG. 3 in more detail, in accordance with an example embodiment. In a training component 400, sample member profiles 402 and sample member activity and behavior information 404 are fed to a feature extractor 406, which acts to extract curated features 408 from the sample member profiles 402 and sample member activity and behavior information 404. Different features may be extracted depending upon whether the member profile is assumed to be that of a prospective search result or that of a prospective searcher.

In an example embodiment, the curated features 408 are then used to as input to a first machine learning algorithm 410 to train a machine-learned model 412 to generate a combined probability that the searcher will select the corresponding potential search result and that the member associated with the corresponding potential search result will respond to a communication from the searcher.

This training may include providing sample search result labels 418 to the first machine learning algorithm 410. Each of these sample search result labels 418 is a binary variable which indicates whether a searcher selected on the corresponding potential search result in the sample member activity and behavior information 404 and/or whether the potential search result responded to a request from the searcher.

In a search result ranking engine 421, candidate records 422 are fed to a feature extractor 424, which acts to extract curated features 426 from the candidate records 422. In some example embodiments, the candidate records 422 include member profile information and member activity and behavior information extracted by the ingestion platform 300, which can use the queries from the user interface server component 302 to retrieve the appropriate information corresponding to potential search results from the profile database 218, the social graph database 220, and the member activity and behavior database 222. The curated features 426 are then used as input to the machine-learned model 412, which outputs a score indicating the probability that the searcher will select the corresponding potential search result and the probability that a member associated with the corresponding potential search result will respond to a communication from the searcher.

This score may be passed to a search result ranker 428, which acts to rank the candidate search results based at least on these probabilities and to return the top n ranked candidate search results.

Thus, the searcher is presented with highly relevant search results based not only on the probability that the search result itself will be of interest to the searcher (based, for example, on the query itself and information about the searcher), but also that the member corresponding to the search result will respond to a communication from the searcher. Therefore, for example, a candidate who might be of extremely high interest to a recruiter but who nevertheless may have a low chance of responding to a communication from the recruiter may not be presented, in favor of a candidate who is of lower interest to the recruiter but has a higher chance of responding to a communication from the recruiter.

Turning now to the creation of the feature vectors, as described earlier, the feature vectors may be the same or may be different for the different machine learning algorithm inputs. What follows is a non-exhaustive list of various features that could be included in such feature vector(s).

In an example embodiment, the features may be divided into five classes: (1) query features, (2) result features, (3) searcher features, (4) query/result features, and (5) searcher/result features. A query feature is one that is drawn from the query itself, such as in cases where the query identifies a specific attribute of a search result, such as a first name, last name, company, or title.

A result feature is one that is drawn from the candidate result itself, such as industry, whether the candidate is considered an open candidate, a job seeker score for the candidate, a number of endorsers of the candidate query/result features, whether the candidate is an influencer, a profile quality score, whether a position or education field is empty, a number of current positions/previous positions, and educations in the search result, a communication delivery score (indicating general willingness to receive communications, as self-reported by members), a quality member score (score calculated by computing how complete a member profile is), a member engagement score, a historical click through rate for the search result from all recruiters, a historical action rate (e.g., number of all actions taken on the result divided by number of impressions of the result in the last three months), number of communications received, number of communications accepted, a decision maker score, the amount of time since the candidate indicated he or she is an open candidate, and whether the candidate has applied for a job.

A searcher feature is one that is drawn from information about the searcher him or herself, such as industry, historical rate of selection of result, and location.

A query/result feature is one that is drawn from a combination of the query and the candidate result, such as number of terms in the query that match some text in the candidate result; number of terms in the query that match specific text fields in the candidate result; the fraction of terms in the query that match some text in the candidate result; the fraction of terms in the query that match specific text fields in the candidate result; the frequency that terms in the query match some text in the candidate result; the frequency that terms in the query match specific text fields in the candidate result; if the query contains a first name and a last name and the candidate result is an influencer, then whether the candidate results matches the first name and last name; whether a position in the query matches a position in the candidate result; whether a title in the query matches a title in the candidate result; Term-Frequency-Inverse Document Frequency score; BM25F score; relative importance of matched terms with respect to query itself and the fields of the candidate result (e.g., number of matched terms^2/(number of terms in the query*number of terms in the field), generated affinity score created by product of query and member embeddings (similarity between search query and candidate result); raw query and candidate result matching features for schools; BM25 for current position summary divided by past position summary; clicks by candidate on advertisements from company employing searcher, if the query is a sample job posting; similarity between fields in the job posting and fields in the candidate result; similarity score between the candidate result and weighted query terms, with the weights learned online: and deep embedding features for title, skill, company, and field of study.

A searcher/result feature is one that is drawn from a combination of the searcher and the candidate result, such as network distance (social network degrees of separation between the searcher and the candidate result), number of common connections, location match, number of matching fields (e.g., current company, past company, school, industry), match score (number of matches squared divided by the product of searcher field size and result field size), recruiter-candidate affinity score (using, e.g., history data for sends and accepts between searcher and candidate result), number of common groups, and company interest score.

In an example embodiment, the machine-learned model 412 is a DCNN. A DCNN is a machine-learning model that effectively infers non-linear relationships between a homogeneous input field and desired outputs, which are either categorical classes or scalars. The DCNN is a model that maps inputs to outputs using a sequence of so-called convolutional layers of artificial neurons. The DCNN may be trained by presenting it with a large number (e.g., greater than 10,000) of sample data and labels. It is trained to minimize the discrepancy (or "loss") between the mode's output and the desired output. After the training, the model may be applied to new input images to produce a useful prediction of the professionalism levels of the new input images.

The DCNN is designed to learn not only scores for candidates, but also to learn the feature hierarchy by defining a number of layers. The process of inference involves taking a given input, applying a sequence of mathematical functions called layers, and calculating the functions on the input data. Each layer extracts features from the output of a previous layer, and all layers are trained jointly. The layer-based architecture is why it is termed a "deep" convolutional neural network.

Figure 5:
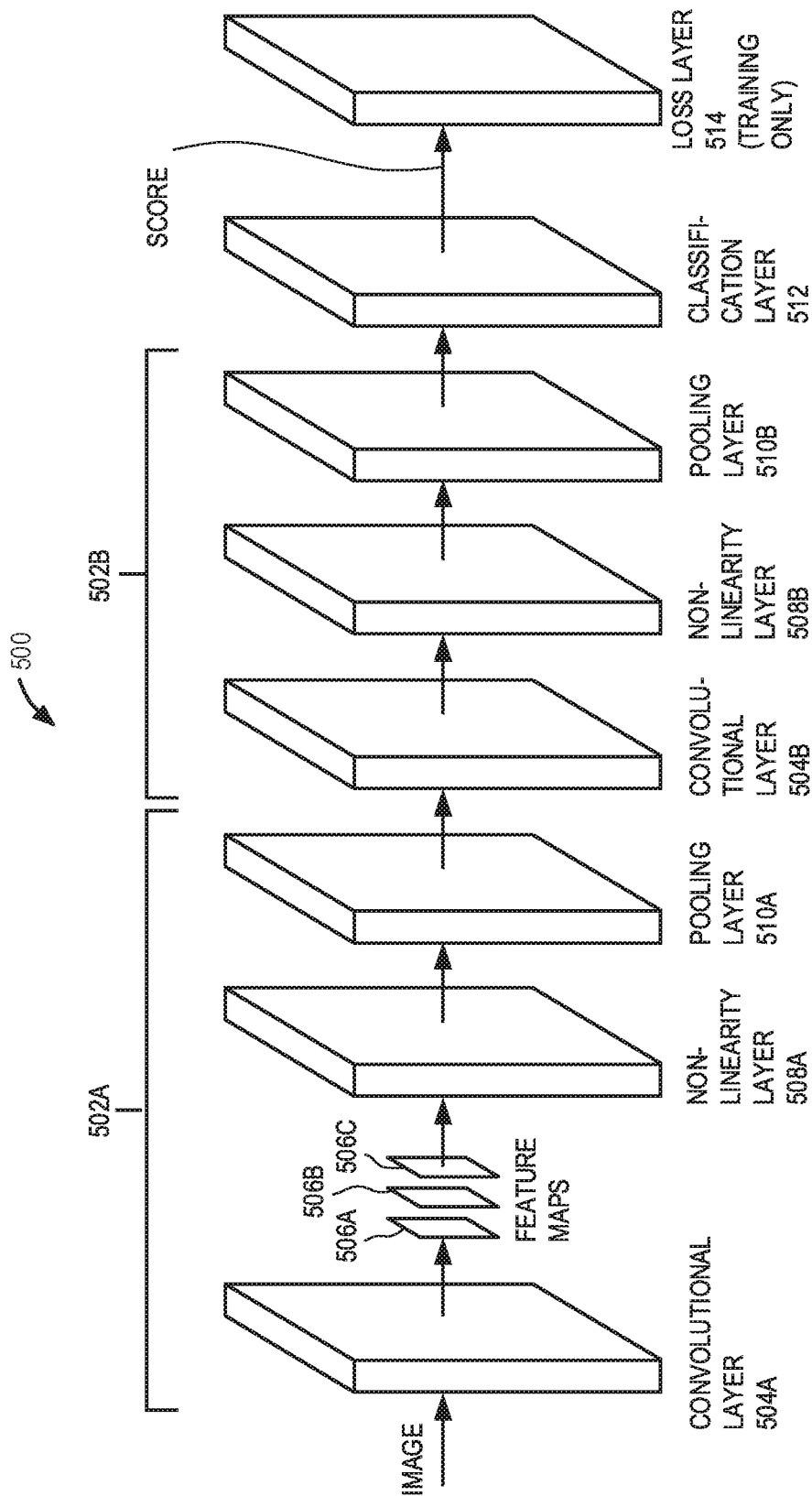
FIG. 5 is a diagram illustrating a Deep Convolutional Neural Network (DCNN), in accordance with an example embodiment.

In an example embodiment, five different types of layers are utilized. The first four layers are the convolutional layer, the nonlinearity layer, the pooling layer, and the classification layer (although the classification is just a special case of convolution followed by "softmax"). These first four layers may be considered to be a stage, and the DCNN 500 may actually be designed to have any number of these stages. Once the stages are all complete, a loss layer is used. FIG. 5 is a diagram illustrating a DCNN 500, in accordance with an example embodiment. The DCNN 500 may be, in some example embodiments, the machine-learned model 412 of FIG. 4. Here, two stages 502A, 502B are depicted.

Convolutional layers 504A, 504B are the core of the DCNN 500. Their parameters include a set of learnable filters that have a small receptive field, but extend through the full depth of the input data. During a forward pass in a convolutional layer 504A, 504B, each filter is convolved across the features, computing the dot product between the entries of the filter and the input and producing a 2-dimensional activation map of that filter. As a result, the DCNN 500 learns filters that activate when they see some specific type of feature.

The feature maps for all filters can be stacked along the depth dimension to form the full volume output of the convolutional layers 504A, 504B.

The convolutional layers 504A, 504B apply mathematical operations called convolutionals. For two spatial dimensions and an indeterminate amount of non-spatial dimensions (referred to as "channels"), the convolutional is defined using the * operator as follows:

$$y[n, m, d] = x * f = \sum_{o} \sum_{j=-M, k=-N}^{j=M, k=N} x[n, m, o] f_d[n - k, m - j, o]$$

The convolutional layers 504A, 504B will typically have some very small support, e.g., N=1 and M=1, such that g[n, m, d]=0 if |n|>1 or |m|>1.

It should be noted that the filters used in the convolutional layers 504A, 504B may be activated in a first iteration of the DCNN 500 and refined prior to each additional iteration, based on actions taken in other layers in the previous iteration, until some error term is minimized below a particular threshold. In one example embodiment, this may be accomplished through back propagation, which is described in more detail below.

The output of the convolutional layers 504A, 504B are sets of arrays called feature maps 506A-506C. Each feature map 506A-506C may be produced by a different filter and modified based on various functions in each stage. At the output, each feature map 506A-506C represents a particular feature extracted at all locations on the input and conditioned. The example in FIG. 5 is of a two-stage system, although one of ordinary skill in the art will recognize that more or fewer stages could be used while still being consistent with the present disclosure, and indeed as will be seen in an example embodiment, the number of stages may be dynamically determined at runtime to optimize results.

Nonlinearity layers 508A, 508B give the DCNN 500 greater expressive power in uncovering nonlinear relationships between input and output. Many different nonlinearities could be used in the nonlinearity layer, including sigmoid, tan h, and rectified linear function. For brevity, one example of nonlinearity will be described here: the rectified linear function. This function is defined by the following:

$$y(x) = \begin{cases} x \text{ if } x > 0 \\ 0 \text{ if } x < 0 \end{cases}$$

Pooling layers 510A, 510B are applied to lower the input image's spatial dimensions while preserving some information from the input image. In other words, the pooling layers 510A, 510B do not actually do any of the learning, i.e.; they are a fixed predefined operation that does not change as training progresses. Instead, they are used as the spatial dimensions of the problem. In one example embodiment, a decimation approach could be followed, where one out of every N samples along a spatial dimension is kept out. In another example embodiment, some local statistics may be used for pooling, such as max pooling, defined as:

$$Y[n, m, d] = \max_{|n'|<N, |m'|<M} x[n + n', m + m', d]$$

where $N = M = 2$.

When all the stages 502A, 502B are complete, a classification layer 512 is used to classify the image using the output of the final pooling layer 510B. As stated above, the classification layer 512 is actually a specialized convolutional layer containing a filter designed to produce the score from the volume output of the final pooling layer 510B. This filter applies a classification function having weights that may be refined in the same manner as the weights in the functions of the filters of the normal convolutional layers 504, 504B.

Back propagation involves calculating a gradient of a loss function (defined later) in a loss layer 514, with respect to a number of weights in the DCNN 500. The gradient is then fed to a method that updates the weights for the next iteration of the training of the DCNN 500 in an attempt to minimize the loss function, which uses a different plurality of sample data (unless there is a need to repeat, such as running out of sample data). Back propagation uses the labeled sample data in a batch of sample data that have been passed through the stages 502A, 502B in order to calculate the loss function gradient for the samples as a group (although, as will be seen later, the loss function may be modified dynamically to eliminate some of the samples from consideration).

Back propagation may include two aspects: propagation and weight update. In the propagation aspect, forward propagation of a training pattern's input images is performed through the DCNN 500 in order to generate the propagation's output activations (i.e., the images are passed through the stages 502A, 502B). Then, backward propagation of the propagation's output activations are performed through the DCNN 502 using a target specified by the training pattern in order to generate the deltas of all output.

In the weight update aspect, for each weight of each filter, the output delta and input activation are multiplied to obtain the gradient of the weight, and then a ratio of the gradient is subtracted from the weight. The ratio influences speed and quality of learning. The higher the ratio, the faster the training, but at the expense of accuracy.

Thus, these two aspects, including both the forward pass and the backward pass through the stages 502A, 502B are performed repeatedly until the error rate is below a particular threshold. An example of back propagation algorithms compatible with the DCNN 500 include, for example, gradient descent.

The use of the back propagation may be predicated on whether or not the combined error of the classification of the images in the batch of labeled sample data transgressed a preset error threshold. If the combined error is too great, then back propagation should occur to update and hopefully minimize the error for the next iteration, and a next iteration is performed with a subsequent batch of labeled sample data, until the combined error does not transgress the threshold.

As described above, the labeled output may be scored for the data. The DCNN 500 outputs a vector that may be compared to the desired output of some loss function, such as the sum square error function:

$$loss = \sum_i (\bar{l}_i - l_i)^2$$

Figure 6:
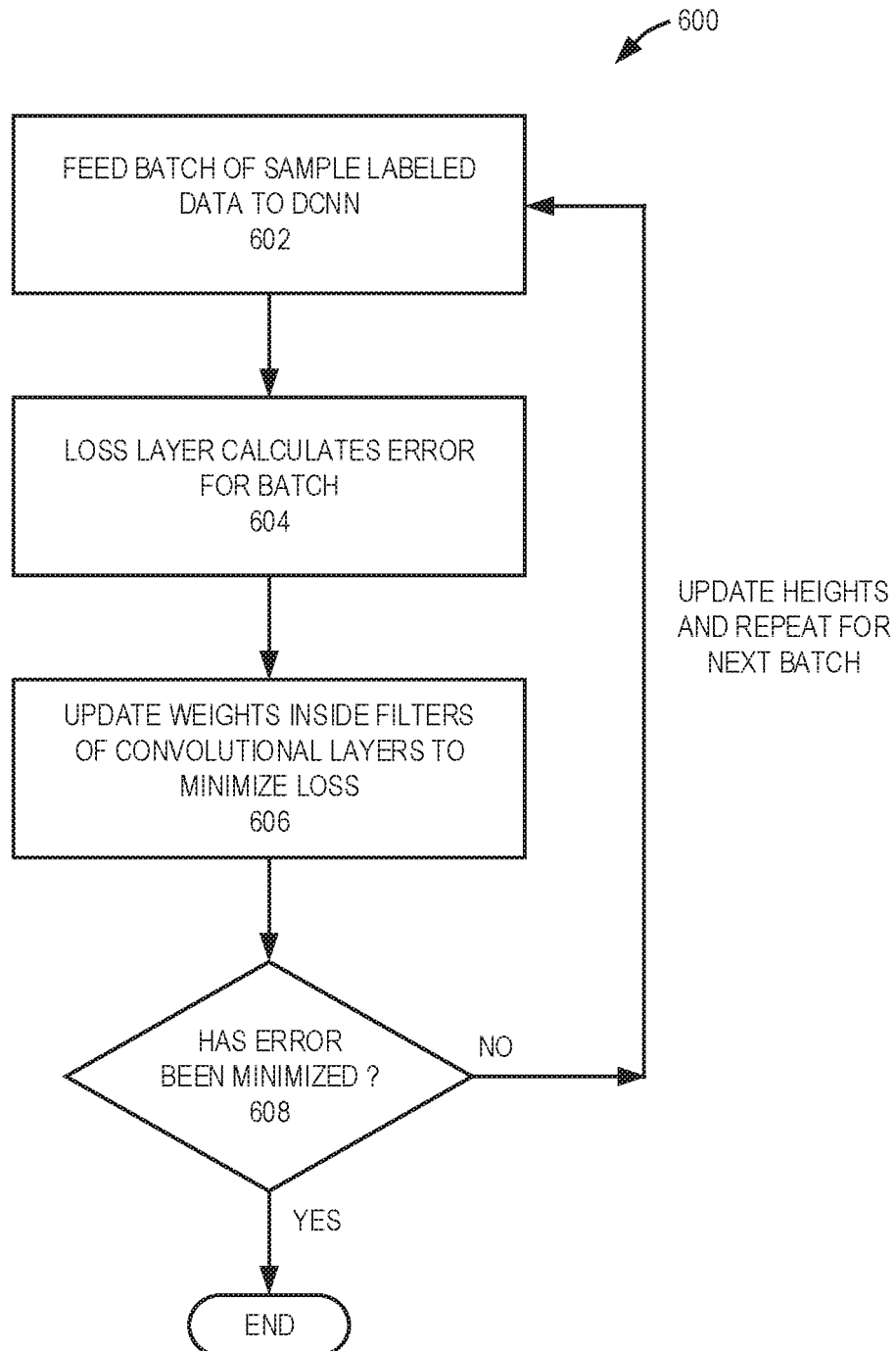
FIG. 6 is a flow diagram illustrating a method of training a DCNN, in accordance with an example embodiment.

As described above, the process of training the DCNN 500 includes a number of different operations. FIG. 6 is a flow diagram illustrating a method 600 of training a DCNN 500, in accordance with an example embodiment. At operation 602, a batch of sample labeled data are fed to the DCNN 500 and the current model of the DCNN 500 produces an output. This output may be, for example, a score for each sample labeled datum. At operation 604, the loss layer 514 of the DCNN 500 calculates the error for the batch of sample data. This error may be, for example, a combination of the individual errors for each of the individual sample labeled data. At operation 606, weights inside the filters in the convolutional layers 504A, 504B (which also include the classification layer 512) are updated to minimize the loss, in accordance with the loss function defined in the loss layer 514. At operation 608, it is determined if the error has been minimized, based on a defined validation set. This defined validation set may include an error threshold, and if that error threshold has been transgressed, then the error has not been minimized and the process repeats back to operation 602 for the next batch of sample labeled images. If the error has been minimized (the threshold has not been transgressed), then the DCNN has been trained.

In an example embodiment, the defined validation set is based on a stochastic gradient descent (SGD) function. SGD comprises the following steps:

1. Randomly select a small number of samples from the training set;
2. Feed the selected samples through all the layers 506-512 in the DCNN 500 until the current error is calculated for each feature map 506A-506C;
3. Update the weights in the convolutional layer 506 with a gradient descent rule:

$$w_{new} = w_{old} - \alpha \nabla \text{error}(w_{old})$$

where w is the weight.

As described earlier, biases such as position bias may be introduced into training data through human interaction and these biases may then be incorporated into the machine-learned model that is trained with the biased training data. One way to reduce or eliminate such biases would be to influence the training data so that it reduces or eliminates the potential for biases. In the example of position bias, this may include at least partially randomizing the ranking of search results presented to users. Specifically, since position bias seems to be most prominent with respect to the first several pages of search results, the top N search results may be randomized before presenting them to users. Since the training data may be derived from actual historical interactions, this may mean deliberately displaying search results with randomized ordering of the top N search results to users (this may be termed "randomized" search results or "randomized" training data). The users that see such randomized search results would then possibly introduce their own biases based on the randomized ordering, but the interactions with the individual search results would essentially be compensated over large data sets.

An issue that results from such a solution, however, is that deliberately displaying randomized search results to users in real-world situations is not ideal. Users expect to view search results in order of relevancy to their queries, based on the machine-learned ranking model, and thus deliberately randomizing these search results before presenting them defeats the purpose of having the ranking model in the first place. Searchers may become frustrated if a large number of their queries result in what would be highly relevant search results buried under less relevant search results.

As such, in an example embodiment, a portion of the training data is from randomized search results while the bulk of the training data is from non-randomized search results.

In an example embodiment, position bias and other types of bias may be compensated for by using two-phase training of a machine-learned model. In a first phase, the machine-learned model is trained using non-randomized training data. Since certain types of machine-learned models, such as those involving deep learning (e.g., neural networks) require a lot of training data, this allows the bulk of the training to be devoted to training using non-randomized training data. However, since this non-randomized training data may be biased, a second training phase is then used to revise the machine-learned model based on randomized training data to remove the bias from the machine-learned model. Since this randomized training data may be less plentiful, this allows the deep learning machine-learned model to be trained to operate in an unbiased manner without the need to generate additional randomized training data.

In an example embodiment, the amount of the training data devoted to randomized search results is kept at a minimum in order to allow for searchers to generally received non-randomized search results. In one example embodiment, 5% of the training data is from randomized search results while 95% of the training data is from non-randomized search results. Since deep-learning machine-learned models such as DCNNs 500 require large amounts of training data, this allows for large training data sets without requiring that large amounts of past search results be randomized.

Figure 7:
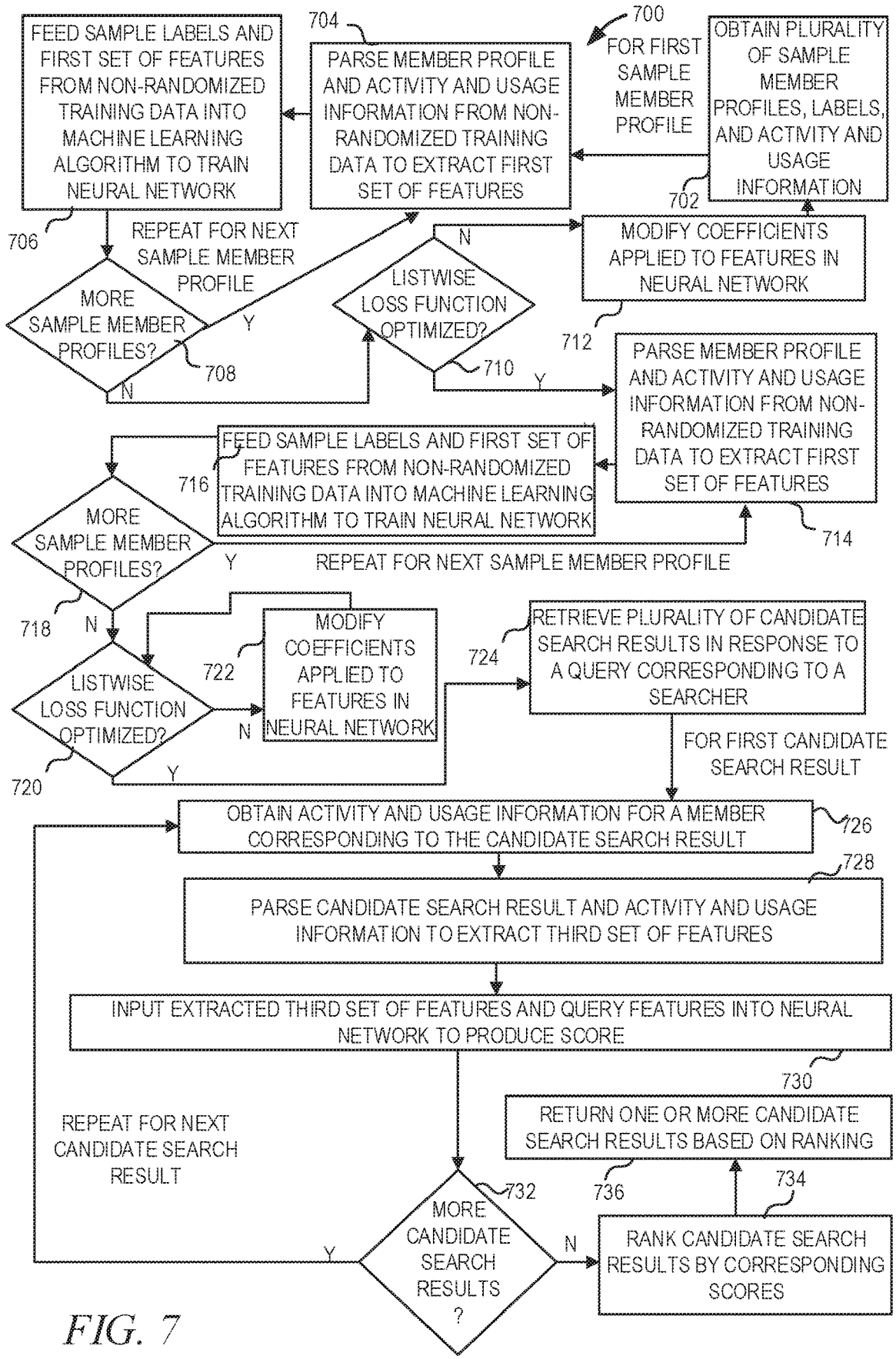
FIG. 7 is a flow diagram illustrating a method for returning search results in an online computer system, in accordance with an example embodiment.

FIG. 7 is a flow diagram illustrating a method 700 for returning search results in an online service, in accordance with an example embodiment. In a training phase, at operation 702, a plurality of sample member profiles of members of the online service are retrieved along with a plurality of sample member labels and activity and usage information pertaining to actions taken by those members on the online service. This plurality of sample member profiles of members of the online service and plurality of sample member labels and activity and usage information pertaining to actions taken by those members on the social networking service may collectively be known as training data. This training data may be divided into randomized training data and non-randomized training data. Both the randomized training data and the non-randomized training data may be derived from the historical presentation of actual search results to searchers on the online service. The labels may be derived from actions taken in the activity and usage, such as communication requests and responses.

A two-phase training process is then begun. Each phase has a loop begun for each member profile in the plurality of sample member profiles. In the first phase, at operation 704, the sample member profile and the activity and usage information pertaining to actions taken by that member on the online service, from the non-randomized training data, are parsed to extract a first set of features. At operation 706, the sample member labels and the extracted first set of features from the non-randomized training data are fed into a first machine learning algorithm to train the machine-learned model to output scores reflective of a probability that a searcher will select a potential search result corresponding to the first sample member profile and a probability that a member corresponding to the first sample member profile will respond to a communication from a searcher having the second sample member profile. At operation 708, it is determined if there are more sample member profiles in the plurality of sample member profiles. If so, then the method 700 loops back to operation 704 for the next sample member profile in the non-randomized training data.

If not, then at operation 710, a listwise loss function is evaluated to determine if the listwise loss function has been optimized. If not, then at operation 712, coefficients applied to values of features by the machine-learned model are modified and the method 700 repeats to operation 702.

Once the listwise loss function has been optimized, the first phase of the training phase is complete and the second phase may begin.

In the second phase, at operation 714, the sample member profile and the activity and usage information pertaining to actions taken by that member on the online service, from the randomized training data, are parsed to extract a first set of features. At operation 716, the sample member labels and the extracted first set of features from the randomized training data are fed into a first machine learning algorithm to train the machine-learned model to output scores reflective of a probability that a searcher will select a potential search result corresponding to the first sample member profile and a probability that a member corresponding to the first sample member profile will respond to a communication from a searcher. At operation 718, it is determined if there are any more sample member profiles in the plurality of sample member profiles from the randomized training data. If so, then the method 700 loops back to operation 714 for the next sample member profile in the non-randomized training data.

If not, then at operation 720, the listwise loss function is evaluated to determine if the listwise loss function has been optimized. If not, then at operation 722, coefficients applied to values of features by the machine-learned model are modified and the method 700 repeats to operation 720.

Once the listwise loss function has been optimized for the second phase of training, the training is complete and a runtime phase begins. At operation 724, a plurality of candidate search results is retrieved in response to a query corresponding to a searcher. Then a loop is begun for each candidate search result in the plurality of candidate search results. At operation 726, activity and usage information for a member corresponding to the candidate search result is obtained. At operation 728, the candidate search result and the activity and usage information for the member are parsed to extract a third set of one or more features. At operation 730, the extracted third set of one or more features are fed into the machine-learned model, which outputs a score. At operation 732, it is determined if there are any more candidate search results in the plurality of candidate search results. If so, then the method 700 loops back to operation 726 for the next candidate search result.

If not, then at operation 734, the plurality of candidate search results are ranked by their corresponding probabilities. At operation 736, one or more of the plurality of candidate search results are returned based on the ranking.

FIG. 8 is a screen capture illustrating a graphical user interface 800 for displaying results of the ranking performed in FIG. 7. Here, one or more candidates 802, 804, 806 are rendered graphically in order of the ranking.

Figure 9:
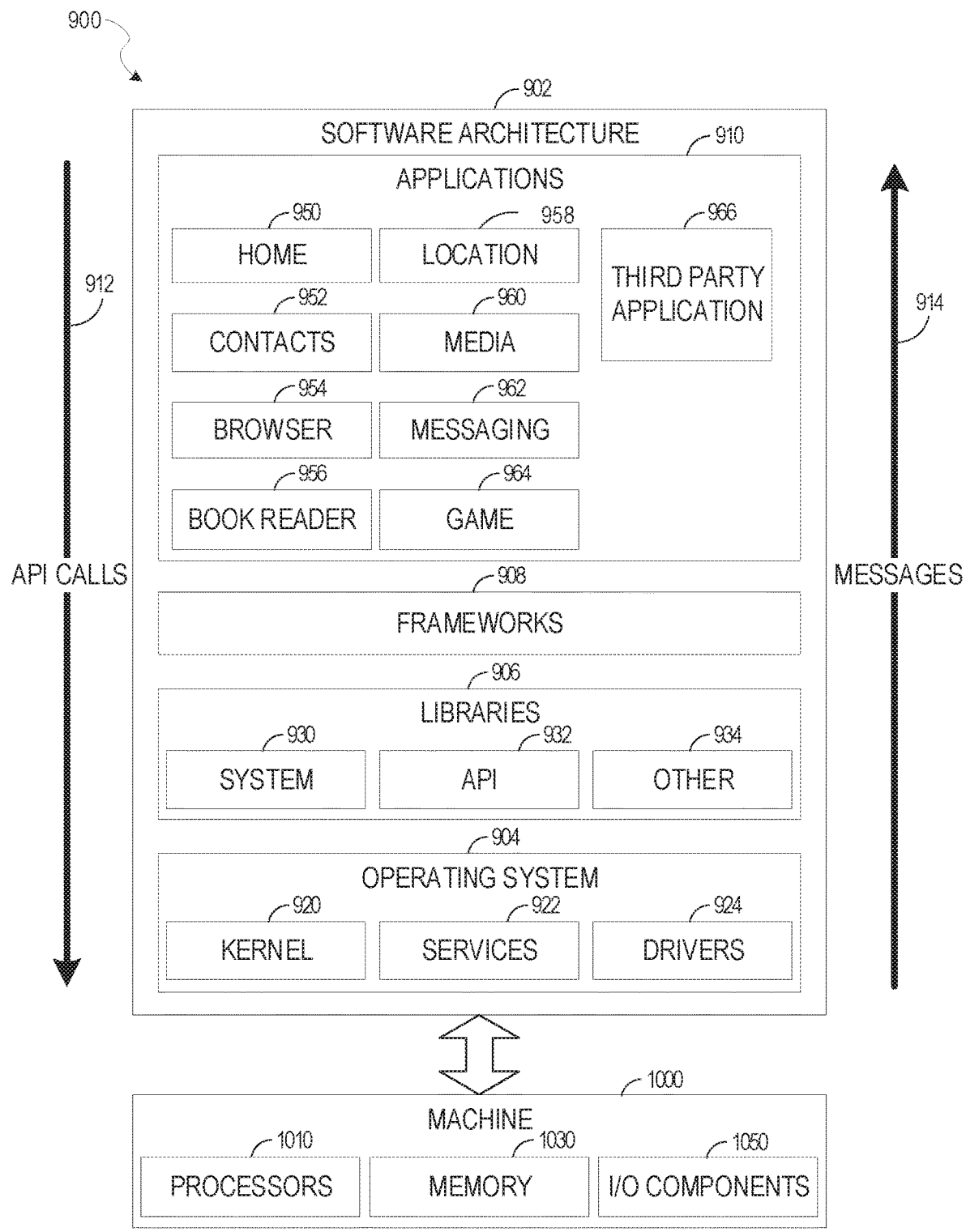
FIG. 9 is a block diagram illustrating an architecture of software, which can be installed on any one or more of the devices described above.

FIG. 9 is a block diagram 900 illustrating an architecture of software 902, which can be installed on any one or more of the devices described above. FIG. 9 is merely a non-limiting example of a software architecture, and it will be appreciated that many other architectures can be implemented to facilitate the functionality described herein. In various embodiments, the software 902 is implemented by hardware such as a machine 1000 of FIG. 10 that includes processors 1010, memory 1030, and input/output (I/O) components 1050. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke API calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiments, the applications 910 include a home application 950, a contacts application 952, a browser application 954, a book reader application 956, a location application 958, a media application 960, a messaging application 962, a game application 964, and a broad assortment of other applications such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™ ANDROID™, WINDOWS® Phone, or another mobile operating system. In this example, the third-party application 966 can invoke the API calls 912 provided by the operating system 904 to facilitate functionality described herein.

Figure 10:
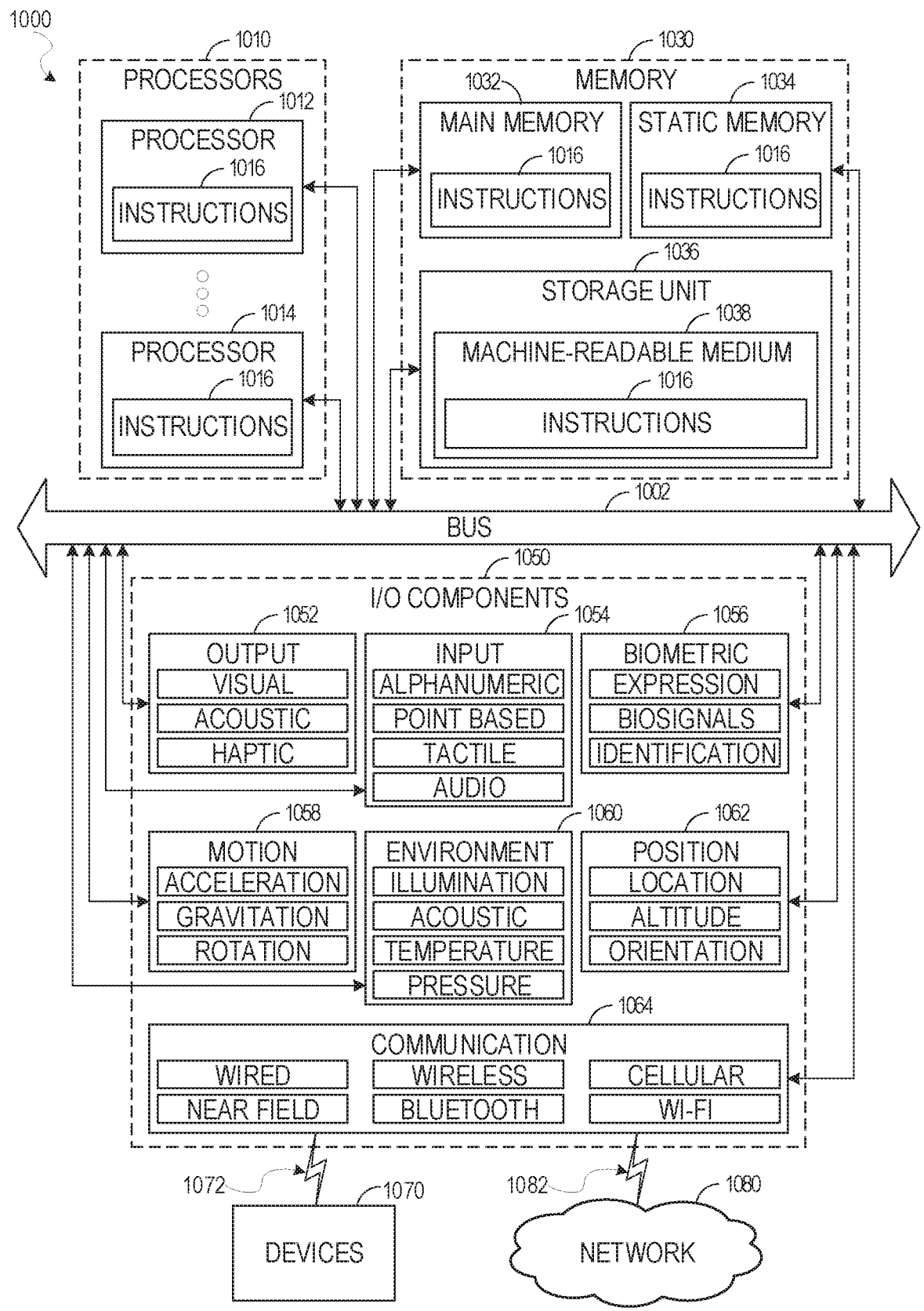
FIG. 10 illustrates a diagrammatic representation of a machine in the form of a computer system within which a set of instructions may be executed for causing the machine to perform any one or more of the methodologies discussed herein, according to an example embodiment.

FIG. 10 illustrates a diagrammatic representation of a machine 1000 in the form of a computer system within which a set of instructions may be executed for causing the machine to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example the instructions 1016 may cause the machine 1000 to execute the method 700 of FIG. 7. Additionally, or alternatively, the instructions 1016 may implement FIGS. 1-8, and so forth. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory 1030 may include a main memory 1032, a static memory 1034, and a storage unit 1036, all accessible to the processors 1010 such as via the bus 1002. The main memory 1030, the static memory 1034, and storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a USB).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1030, 1032, 1034, and/or memory of the processor(s) 1010) and/or storage unit 1036 may store one or more sets of instructions and data structures (e.g., software) embodying or utilized by any one or more of the methodologies or functions described herein. These instructions (e.g., the instructions 1016), when executed by processor(s) 1010, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1080 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., HTTP). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system for returning search results in an online computer system, the system comprising:
 a computer readable medium having instructions stored there on, which, when executed by a processor, cause the system to:
  retrieve training data, the training data comprising a plurality of search results, a plurality of sample labels, and activity and usage information pertaining to actions taken by users on the search results on an online service, the training data comprising randomized and non-randomized training data, the randomized training data derived from historical presentation of a first subset of the plurality of search results using a randomized ranking and the non-randomized training data derived from historical presentation of a second subset of the plurality of search results using a non-randomized ranking;
  for each sample search result in a plurality of sample search results in the non-randomized training data:
   parse the sample search result and the activity and usage information pertaining to the sample search result in the non-randomized training data to extract a first set of one or more features;
   feed a sample member label corresponding to the sample search result and the extracted first set of one or more features into a first machine learning algorithm to train a machine-learned model to output a score indicative of a probability that an action will be taken, in the online service, pertaining to the sample search result;
  for each sample search result in a plurality of sample search results in the randomized training data:
   parse the sample search result and the activity and usage information pertaining to the sample search result in the randomized training data to extract a second set of one or more features; and
   feed a sample member label corresponding to the sample search result in the randomized training data and the extracted second set of one or more features into the first machine learning algorithm to revise the machine-learned model.

2. The system of claim 1, wherein the instructions further cause the system to:
 obtain a plurality of candidate search results in response to a query corresponding to a searcher;
 for each candidate search result from the plurality of candidate search results:
  obtain activity and usage information for the candidate search result;
  parse the candidate search result and the activity and usage information corresponding to the candidate search result to extract a third set of one or more features;
  feed the extracted third set of one or more features into the machine-learned model, outputting a score for the candidate search result;
 rank the plurality of candidate search results by their corresponding scores; and
 return one or more of the plurality of candidate search results based on the ranking.

3. The system of claim 1, wherein the non-randomized training data is more plentiful than the randomized training data.

4. The system of claim 1, wherein the machine-learned model is a neural network.

5. The system of claim 1, wherein the machine-learned model is a deep learning model.

6. The system of claim 1, wherein the sample search results and candidate search results are member profiles in the online service.

7. The system of claim 6, wherein the actions taken by users on the search results are responses to communication requests from searchers.

8. A computer-implemented method for returning search results in an online computer system, the method comprising:
- retrieving training data, the training data comprising a plurality of search results, a plurality of sample labels, and activity and usage information pertaining to actions taken by users on the search results on an online service, the training data comprising randomized and non-randomized training data, the randomized training data derived from historical presentation of a first subset of the plurality of search results using a randomized ranking and the non-randomized training data derived from historical presentation of a second subset of the plurality of search results using a non-randomized ranking;
- for each sample search result in a plurality of sample search results in the non-randomized training data:
  - parsing the sample search result and the activity and usage information pertaining to the sample search result in the non-randomized training data to extract a first set of one or more features;
  - feeding a sample member label corresponding to the sample search result and the extracted first set of one or more features into a first machine learning algorithm to train a machine-learned model to output a score indicative of a probability that an action will be taken, in the online service, pertaining to the sample search result;
- for each sample search result in a plurality of sample search results in the randomized training data:
  - parsing the sample search result and the activity and usage information pertaining to the sample search result in the randomized training data to extract a second set of one or more features; and
  - feeding a sample member label corresponding to the sample search result in the randomized training data and the extracted second set of one or more features into the first machine learning algorithm to revise the machine-learned model.

9. The method of claim 8, further comprising:
- obtaining a plurality of candidate search results in response to a query corresponding to a searcher;
- for each candidate search result from the plurality of candidate search results:
  - obtaining activity and usage information for the candidate search result;
  - parsing the candidate search result and the activity and usage information corresponding to the candidate search result to extract a third set of one or more features;
  - feeding the extracted third set of one or more features into the machine-learned model, outputting a score for the candidate search result;
- ranking the plurality of candidate search results by their corresponding scores; and
- returning one or more of the plurality of candidate search results based on the ranking.

10. The method of claim 8, wherein the non-randomized training data is more plentiful than the randomized training data.

11. The method of claim 8, wherein the machine-learned model is a neural network.

12. The method of claim 8, wherein the machine-learned model is a deep learning model.

13. The method of claim 8, wherein the sample search results and candidate search results are member profiles in the online service.

14. The method of claim 13, wherein the actions taken by users on the search results are responses to communication requests from searchers.

15. A non-transitory machine-readable storage medium comprising instructions, which when implemented by one or more machines, cause the one or more machines to perform operations comprising:
- retrieving training data, the training data comprising a plurality of search results, a plurality of sample labels, and activity and usage information pertaining to actions taken by users on the search results on an online service, the training data comprising randomized and non-randomized training data, the randomized training data derived from historical presentation of a first subset of the plurality of search results using a randomized ranking and the non-randomized training data derived from historical presentation of a second subset of the plurality of search results using a non-randomized ranking;
- for each sample search result in a plurality of sample search results in the non-randomized training data:
  - parsing the sample search result and the activity and usage information pertaining to the sample search result in the non-randomized training data to extract a first set of one or more features;
  - feeding a sample member label corresponding to the sample search result and the extracted first set of one or more features into a first machine learning algorithm to train a machine-learned model to output a score indicative of a probability that an action will be taken, in the online service, pertaining to the sample search result;
- for each sample search result in a plurality of sample search results in the randomized training data:
  - parsing the sample search result and the activity and usage information pertaining to the sample search result in the randomized training data to extract a second set of one or more features; and
  - feeding a sample member label corresponding to the sample search result in the randomized training data and the extracted second set of one or more features into the first machine learning algorithm to revise the machine-learned model.

16. The non-transitory machine-readable storage medium of claim 15, wherein the instructions further comprise:
- obtaining a plurality of candidate search results in response to a query corresponding to a searcher;
- for each candidate search result from the plurality of candidate search results:
  - obtaining activity and usage information for the candidate search result;
  - parsing the candidate search result and the activity and usage information corresponding to the candidate search result to extract a third set of one or more features;
  - feeding the extracted third set of one or more features into the machine-learned model, outputting a score for the candidate search result;
- ranking the plurality of candidate search results by their corresponding scores; and
- returning one or more of the plurality of candidate search results based on the ranking.

17. The non-transitory machine-readable storage medium of claim 15, wherein the non-randomized training data is more plentiful than the randomized training data.

18. The non-transitory machine-readable storage medium of claim 15, wherein the machine-learned model is a neural network.

19. The non-transitory machine-readable storage medium of claim 15, wherein the machine-learned model is a deep learning model.

20. The non-transitory machine-readable storage medium of claim 15, wherein the sample search results and candidate search results are member profiles in the online service.

* * * * *